(12) United States Patent
Shiomi et al.

(10) Patent No.: US 12,345,631 B2
(45) Date of Patent: Jul. 1, 2025

(54) GAS DETECTION DEVICE AND GAS DETECTION METHOD

(71) Applicant: KABUSHIKI KAISHA TOSHIBA, Tokyo (JP)

(72) Inventors: Yasutomo Shiomi, Koza Kanagawa (JP); Shinji Saito, Yokohama Kanagawa (JP); Rei Hashimoto, Tokyo (JP); Kei Kaneko, Yokohama Kanagawa (JP); Tsutomu Kakuno, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 200 days.

(21) Appl. No.: 18/168,764

(22) Filed: Feb. 14, 2023

(65) Prior Publication Data
US 2023/0296503 A1 Sep. 21, 2023

(30) Foreign Application Priority Data
Mar. 18, 2022 (JP) .................. 2022-043455

(51) Int. Cl.
*G01N 21/3504* (2014.01)

(52) U.S. Cl.
CPC .............. *G01N 21/3504* (2013.01); *G01N 2201/06113* (2013.01); *G01N 2201/0636* (2013.01)

(58) Field of Classification Search
CPC ..... G01N 21/3504; G01N 2201/06113; G01N 2201/0636; G01N 2021/1793
See application file for complete search history.

(56) References Cited

U.S. PATENT DOCUMENTS

| 4,999,498 A | 3/1991 | Hunt et al. |
| 2009/0116518 A1* | 5/2009 | Patel ............ H04J 14/02 372/101 |

(Continued)

FOREIGN PATENT DOCUMENTS

| CN | 112649389 A * | 4/2021 | ............. F24F 11/89 |
| JP | H07-280697 A | 10/1995 | |

(Continued)

OTHER PUBLICATIONS

Translation of CN 112649389 A (Year: 2021).*

*Primary Examiner* — David P Porta
*Assistant Examiner* — Mamadou Faye
(74) *Attorney, Agent, or Firm* — Knobbe, Martens, Olson & Bear, LLP

(57) ABSTRACT

A gas detection device according to an embodiment includes a first irradiation part configured to irradiate a first light having a first wavelength on a gas released into a space, a second irradiation part configured to irradiate, on the gas, a second light having a second wavelength that is less than the first wavelength, an irradiation position adjustment part configured to control an irradiation position of the first light on the gas, a gas analysis part configured to analyze a component of the gas based on the first light having passed through the gas, and a gas visualization part configured to visualize a concentration distribution of the gas based on the second light having passed through the gas. The irradiation position adjustment part controls the irradiation position of the first light on the gas based on the visualized concentration distribution of the gas.

18 Claims, 4 Drawing Sheets

(56) References Cited

U.S. PATENT DOCUMENTS

| | | |
|---|---|---|
| 2010/0018289 A1 | 1/2010 | Oda |
| 2010/0302546 A1* | 12/2010 | Azimi .................. G01J 3/02 |
| | | 356/243.1 |
| 2015/0047363 A1* | 2/2015 | Steinwandel ......... F23C 99/001 |
| | | 60/722 |
| 2020/0355624 A1* | 11/2020 | Mai .................... G02B 9/08 |
| 2022/0170842 A1* | 6/2022 | Lee ................ G01N 15/1433 |

FOREIGN PATENT DOCUMENTS

| | | |
|---|---|---|
| JP | 3060312 B2 | 7/2000 |
| JP | 2003-294573 A | 10/2003 |
| JP | 2008-026190 A | 2/2008 |
| JP | 2009-174990 A | 8/2009 |
| JP | 2017-062176 A | 3/2017 |
| JP | 2018-185190 A | 11/2018 |

* cited by examiner

GAS DETECTION DEVICE AND GAS DETECTION METHOD

CROSS-REFERENCE TO RELATED APPLICATIONS

This application is based upon and claims the benefit of priority from Japanese Patent Application No. 2022-043455, filed on Mar. 18, 2022; the entire contents of which are incorporated herein by reference.

FIELD

Embodiments described herein relate generally to a gas detection device and a gas detection method.

BACKGROUND

Molecules have unique absorption spectra for infrared. Therefore, by irradiating infrared into an object space, a gas released into the space can be detected, and component analysis of the gas released into the space can be performed.

However, the gas that is released into the space has a concentration (density) distribution. Therefore, there is a risk that the detection sensitivity and/or analysis accuracy may degrade according to the irradiation position of the infrared on the gas released into the space.

It is therefore desirable to develop technology that can appropriately detect the gas released into the space.

DETAILED DESCRIPTION

Figure 1:
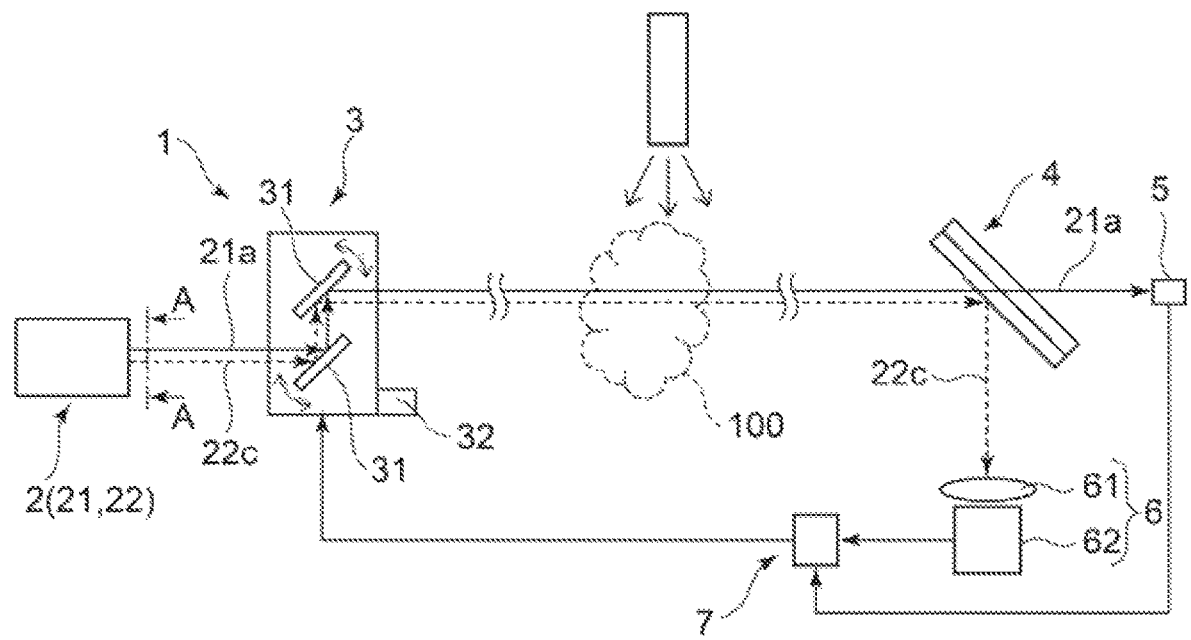
FIG. 1 is a schematic view illustrating a gas detection device according to an embodiment.

A gas detection device according to an embodiment includes a first irradiation part configured to irradiate a first light having a first wavelength on a gas released into a space, a second irradiation part configured to irradiate, on the gas, a second light having a second wavelength that is less than the first wavelength, an irradiation position adjustment part configured to control an irradiation position of the first light on the gas, a gas analysis part configured to analyze a component of the gas based on the first light having passed through the gas, and a gas visualization part configured to visualize a concentration distribution of the gas based on the second light having passed through the gas. The irradiation position adjustment part controls the irradiation position of the first light on the gas based on the visualized concentration distribution of the gas.

Exemplary embodiments will now be described with reference to the drawings. Similar components in the drawings are marked with the same reference numerals; and a detailed description is omitted as appropriate.

FIG. 1 is a schematic view illustrating a gas detection device 1 according to an embodiment.

Light 21a and light 22c are illustrated as being separated from each other to avoid confusion in FIG. 1.

Figure 2:
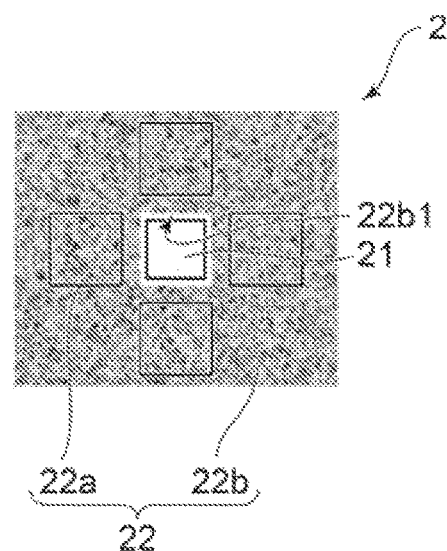
FIG. 2 is a schematic view of the light source of FIG. 1 when viewed along the direction of line A-A.

FIG. 2 is a schematic view of a light source 2 of FIG. 1 when viewed along the direction of line A-A.

As shown in FIG. 1, the gas detection device 1 includes the light source 2, an irradiation position adjustment part 3, a light splitting part 4, a gas analysis part 5, a gas visualization part 6, and a controller 7.

As shown in FIGS. 1 and 2, the light source 2 includes, for example, a first irradiation part 21 and a second irradiation part 22.

The first irradiation part 21 irradiates the light 21a (corresponding to an example of a first light) on a gas 100 that is released into a space. The wavelength of the light 21a is, for example, not less than 0.7 μm (corresponding to an example of a first wavelength). The light 21a is, for example, infrared, near-infrared, etc. The first irradiation part 21 is, for example, a quantum cascade laser (QCL) that includes a compound semiconductor, etc. By using a quantum cascade laser as the first irradiation part 21, downsizing of the first irradiation part 21 is easy.

The second irradiation part 22 irradiates the light 22c (corresponding to an example of a second light) on the gas 100 released into the space.

The second irradiation part 22 includes, for example, a light-emitting part 22a and a filter 22b that forms a dot pattern.

The light-emitting part 22a irradiates the light 22c. The wavelength of the light 22c (corresponding to an example of a second wavelength) is less than the wavelength of the light 21a. The wavelength of the light 22c is, for example, not less than 360 nm and not more than 830 nm. The light 22c is, for example, visible light such as red light, etc. The light-emitting part 22a can be, for example, a light-emitting element, a discharge lamp, etc. The light-emitting element is, for example, a light-emitting diode, a laser diode, an organic light-emitting diode, etc. In such a case, by using a light-emitting element as the light-emitting part 22a, downsizing of the second irradiation part 22 is easy. Also, the distance between the optical axis of the first irradiation part 21 and the optical axis of the second irradiation part 22 can be reduced.

At least one light-emitting part 22a can be included. When multiple light-emitting parts 22a are included, the multiple light-emitting parts 22a can be provided to surround the first irradiation part 21 when viewed along a direction along the optical axis of the first irradiation part 21. In such a case, for example, the multiple light-emitting parts 22a can be positioned to have point symmetry around the optical axis of the first irradiation part 21.

The filter 22b that forms the dot pattern is plate-shaped and is located at the irradiation side of the light 22c of the light-emitting part 22a. The filter 22b that forms the dot pattern includes a hole 22b1 extending through the filter 22b in the thickness direction. The light 21a that is irradiated from the first irradiation part 21 is irradiated on the gas 100 via the hole 22b1. The light 22c that is irradiated from the light-emitting part 22a is irradiated on the gas 100 via the filter 22b forming the dot pattern.

A fine unevenness is provided in the surface of the filter 22b forming the dot pattern. By providing the fine unevenness in the surface of the filter 22b forming the dot pattern, the light 22c that is irradiated from the second irradiation part 22 can be provided with a bright and dark unevenness. If the light 22c has a bright and dark unevenness, the contrast can be increased when visualizing the concentration distribution of the gas 100 described below.

In such a case, if the arrangement of the unevenness has a certain regularity, there is a risk that interference fringes called moire may occur. It is therefore favorable for the arrangement of the unevenness to be random. For example, the filter 22b that forms the dot pattern can be a filter forming a so-called random dot pattern.

Here, it is not always necessary for the central axis of the light 22c irradiated from the multiple light-emitting parts 22a to be coaxial with the optical axis of the first irradiation part 21. For example, the second irradiation part 22 can be located in a separate body separated from the first irradiation part 21.

However, the control of the irradiation position of the light 21a on the gas 100 is easy when the optical axis of the first irradiation part 21 is coaxial with the optical axis of the second irradiation part 22. Details related to the control of the irradiation position of the light 21a are described below.

For example, the optical axis of the first irradiation part 21 can be coaxial with the optical axis of the second irradiation part 22 by positioning the multiple light-emitting parts 22a to have point symmetry around the optical axis of the first irradiation part 21.

It is not always necessary to simultaneously irradiate the lights 21a and 22c. For example, first, the light 22c can be irradiated on the gas 100; and the visualization of the concentration distribution of the gas 100 described below can be performed. Then, the irradiation position of the light 21a on the gas 100 can be determined based on the visualized concentration distribution of the gas 100. Then, the light 21a can be irradiated toward the determined irradiation position.

The irradiation position adjustment part 3 controls the irradiation positions of the lights 21a and 22c on the gas 100.

The irradiation position adjustment part 3 includes, for example, a mirror 31 and a driver 32.

At least one mirror 31 can be included. The mirror 31 is pivotable. The mirror 31 reflects the incident lights 21a and 22c and causes the lights 21a and 22c to be incident on the gas 100. The reflected light from the mirror 31 may be parallel light or diverging light. However, when the light 22c is parallel light, the visualization of the concentration distribution of the gas 100 described below is easy.

The driver 32 changes the angle of the mirror 31 to change the reflection angles of the lights 21a and 22, which in turn changes the irradiation positions of the lights 21a and 22c on the gas 100. The driver 32 can include, for example, a control motor such as a servo motor, etc.

The lights 21a and 22 that pass through the gas 100 are incident on the light splitting part 4. The distance between the irradiation position adjustment part 3 and the light splitting part 4 is not particularly limited. For example, the gas detection device 1 can be used in remote detection in which the gas 100 is detected from a distant position. However, the applications of the gas detection device 1 are not limited to remote detection. The distance between the irradiation position adjustment part 3 and the light splitting part 4 may be short.

The light splitting part 4 splits the light 21a and the light 22c. For example, the light splitting part 4 can be a beam splitter. For example, as shown in FIG. 1, the light splitting part 4 transmits the light 21a and reflects the light 22c. The light splitting part 4 illustrated in FIG. 1 is, for example, a half mirror.

The light splitting part 4 may be pivotable; and the position of the light splitting part 4 may be changed according to the pivot position of the mirror 31 (the reflection positions of the lights 21a and 22c). For example, the driver 32 also can be provided for the light splitting part 4.

The light 21a that passes through the gas 100 and the light splitting part 4 is incident on the gas analysis part 5. The gas analysis part 5 analyzes the components of the gas 100 based on the light 21a having passed through the gas 100. For example, the infrared absorption spectrum that is obtained by graphing the wave number of the incident light 21a on the horizontal axis and the transmittance (the absorbance) on the vertical axis has a shape unique to the molecule. Therefore, the molecules included in the gas 100, i.e., the components of the gas 100, can be analyzed based on the obtained infrared absorption spectra.

Therefore, the gas analysis part 5 can be a sensor that detects infrared and/or near-infrared. The gas analysis part 5 can be, for example, a MCT sensor, i.e., a semiconductor sensor that uses mercury (Hg)·cadmium (Cd)·tellurium (Te). The gas analysis part 5 transmits data of the detected components of the gas 100 to the controller 7.

Here, as shown in FIG. 1, the gas 100 is a gas that is released into a space. A distribution occurs in the concentration (the density) of the gas 100 when the gas 100 is released into the space. Therefore, when the irradiation position of the light 21a on the gas 100 is constant, there are cases where the detected value of the gas analysis part 5 fluctuates according to the detection timing of the gas analysis part 5. When the detected value fluctuates, there is a risk that the detection sensitivity and/or analysis accuracy may degrade.

Therefore, the gas visualization part 6 is included in the gas detection device 1.

The light 22c that passes through the gas 100 and is reflected by the light splitting part 4 is incident on the gas visualization part 6. The gas visualization part 6 visualizes the concentration distribution of the gas 100 based on the light 22c having passed through the gas 100.

The gas visualization part 6 includes, for example, an optical component 61 and a detecting part 62.

For example, the optical component 61 condenses the incident light 22c. The optical component 61 is, for example, a convex lens, etc. The optical component 61 is not always necessary and can be omitted. However, the detection sensitivity and/or detection accuracy can be increased by providing the optical component 61.

The detecting part 62 detects the light 22c that passes through the gas 100 and is reflected by the light splitting part 4. The detecting part 62 includes, for example, multiple light-receiving elements arranged in a planar configuration. The detecting part 62 can be, for example, a CCD image sensor, etc.

As described above, the concentration of the gas 100 released into the space has a distribution. In such a case, the refractive index of the light 22c at the portion of high concentration and the refractive index of the light 22c at the portion of low concentration are different from each other. Therefore, the emission direction of the incident light 22c changes according to the concentration of the gas 100. When the emission direction of the light 22c changes, a fringe pattern or hazy shadow occurs in the optical image detected by the detecting part 62.

The detecting part 62 transmits data of the detected optical image to the controller 7.

The controller 7 includes, for example, storage such as semiconductor memory or the like, a calculation part such as a CPU, etc. The controller 7 is, for example, a computer. For example, a control program that controls operations of the components included in the gas detection device 1, programs that calculate the irradiation position of the light 21a based on the data of the optical image detected by the detecting part 62, etc., can be stored in the storage. For example, the data of the optical image detected by the detecting part 62 also can be temporarily stored in the storage.

For example, the controller 7 calculates the irradiation position of the light 21a on the gas 100 based on the data of the optical image detected by the detecting part 62. For example, the controller 7 controls the operation of the irradiation position adjustment part 3 based on the control program stored in the storage and the determined irradiation position of the light 21a. For example, the controller 7 also can transmit the data of the optical image detected by the detecting part 62 and the determined irradiation position of the light 21a to a display device, an external device, etc.

The control of the irradiation position of the light 21a will now be described further.

Figure 3:
FIG. 3 is a photograph illustrating an optical image detected by a detecting part.

FIG. 3 is a photograph illustrating the optical image detected by the detecting part 62.

When the concentration of the gas 100 released into the space has a distribution, a fringe pattern and/or hazy shadow occurs in the optical image as shown in FIG. 3.

Therefore, by taking the first derivative over space of the data of the optical image detected by the detecting part 62, portions at which the change of the concentration is large (portions at which the luminance difference (the gradient) of the pixels is large) can be extracted. The extraction of a portion that has a high concentration and a low spatial concentration change and is surrounded with a portion having a large concentration change can be performed by image processing. A portion at which the concentration change is low also can be calculated by combining processing of taking the first derivative over time. Because the components of the gas 100 are stable at portions having a low concentration change, the gas 100 that is released into the space can be appropriately detected by irradiating the light 21a on this portion.

If the optical axis of the first irradiation part 21 is coaxial with the optical axis of the second irradiation part 22, the center of the obtained optical image is the irradiation position of the light 21a. Therefore, the distance and direction to move the irradiation position of the light 21a can be determined based on the center position of the optical image and the position of the portion having the low concentration change extracted by the image processing.

When detecting the gas 100 having a low concentration (the gas 100 that includes trace components), a portion at which the concentration of the gas 100 is high can be extracted. Thus, the detection sensitivity and/or the analysis accuracy can be increased. Even when detecting the gas 100 having a low concentration, the distance and direction to move the irradiation position of the light 21a can be determined similarly to the description described above.

The controller 7 controls the irradiation position of the light 21a on the gas 100 based on the determined distance and direction. For example, the controller 7 controls the irradiation position of the light 21a on the gas 100 by controlling the driver 32 to change the angle of the mirror 31. In other words, the irradiation position adjustment part 3 controls the irradiation position of the light 21a on the gas 100 based on the visualized concentration distribution of the gas 100.

As described above, by using the gas detection device 1 according to the embodiment, the light 21a can be irradiated on a portion of the gas 100 released into the space that has a low concentration change. Therefore, even when the concentration of the gas 100 has a distribution, the degradation of the detection sensitivity and/or analysis accuracy can be suppressed. The detection sensitivity and/or analysis accuracy can be increased even when detecting the gas 100 having a low concentration. In other words, by using the gas detection device 1 according to the embodiment, the gas 100 that is released into the space can be appropriately detected.

Figure 4:
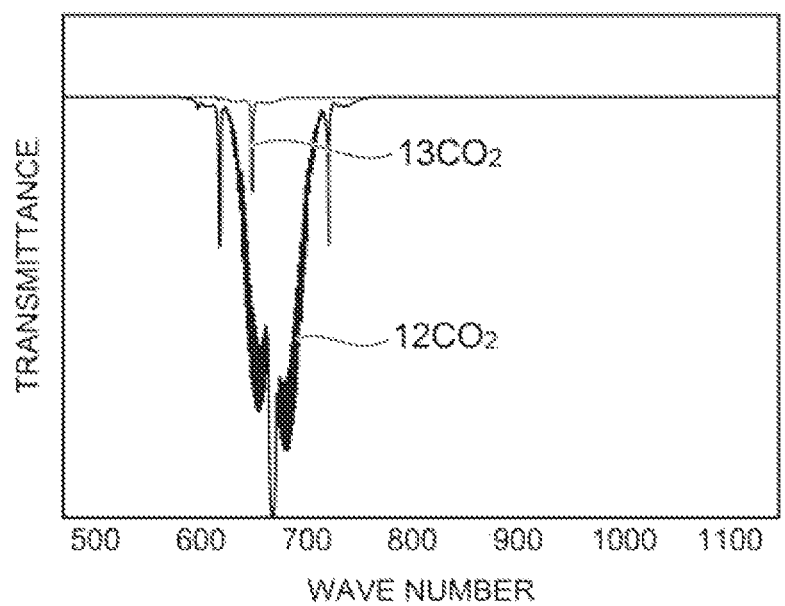
FIG. 4 is a graph illustrating a detection result when a gas visualization part is included.
Figure 5:
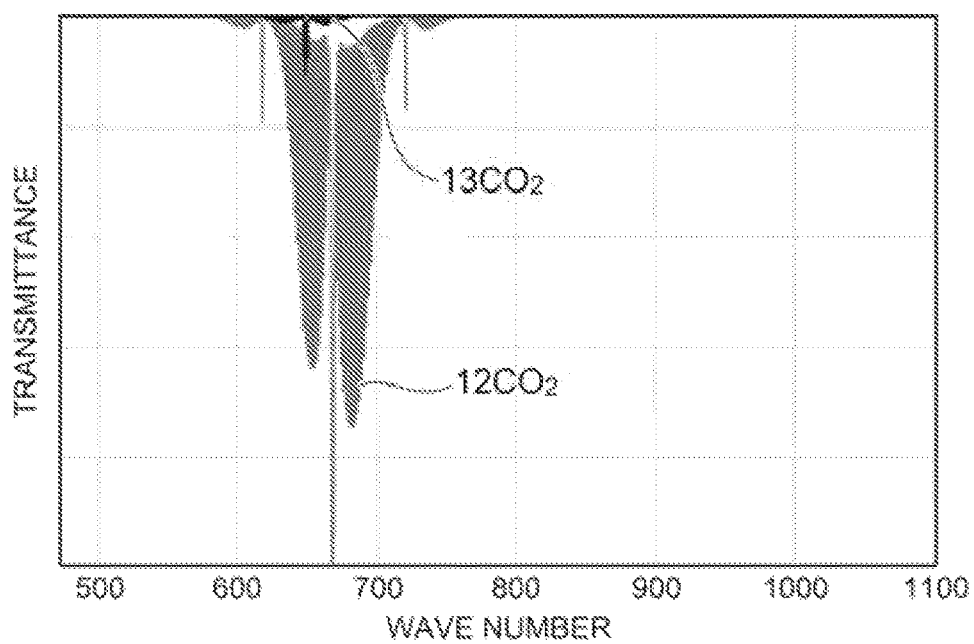
FIG. 5 is a graph illustrating a detection result when a gas visualization part is not included.

FIG. 4 is a graph illustrating a detection result when the gas visualization part 6 is included. FIG. 5 is a graph illustrating a detection result when the gas visualization part 6 is not included. Namely, FIG. 5 shows the case where the detection of the gas 100 is performed by simply irradiating the light 21a on the gas 100 without detecting the concentration distribution of the gas 100; and it can be seen that the absorption amount is reduced because the $CO_2$ gas concentration is low at the detected location.

The gas 100 of FIGS. 4 and 5 is $CO_2$ gas. FIG. 4 measures a location of a high partial pressure of the gas 100, i.e., 5 atm, whereas FIG. 5 measures a location of a low partial pressure, i.e., a low concentration of 1 atm. Therefore, it can be seen that the transmittance greatly changes. That is, it can be seen that the measurement accuracy is degraded.

It is apparent from FIGS. 4 and 5 that the detection sensitivity and/or analysis accuracy can be remarkably improved by the gas visualization part 6 detecting the concentration distribution of the gas 100.

Figure 6:
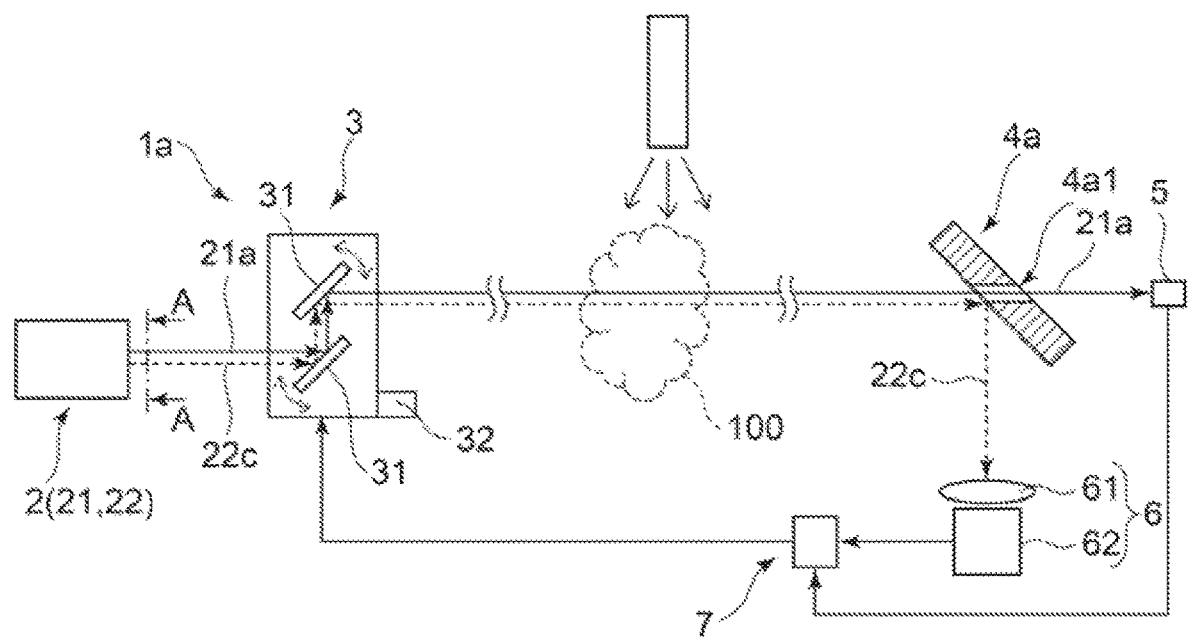
FIG. 6 is a schematic view illustrating a gas detection device according to another embodiment.

FIG. 6 is a schematic view illustrating a gas detection device 1a according to another embodiment.

As shown in FIG. 6, the gas detection device 1a includes the light source 2, the irradiation position adjustment part 3, a light splitting part 4a, the gas analysis part 5, the gas visualization part 6, and the controller 7.

The light splitting part 4a splits the light 21a and the light 22c. For example, the light splitting part 4a includes a hole 4a1 extending through the light splitting part 4a in the thickness direction. For example, as shown in FIG. 6, the light 21a having passed through the gas 100 is incident on the gas analysis part 5 via the hole 4a1 provided in the light splitting part 4a. The light 22c having passed through the gas 100 is reflected around the perimeter edge of the hole 4a1 provided in the light splitting part 4a and is incident on the gas visualization part 6.

In other words, the light 21a and the light 22c can be split by using the light splitting part 4a including the hole 4a1 as well. It is sufficient that the light splitting part can split the light 21a and the light 22c. For example, the light splitting part may be a prism, etc.

Figure 7:
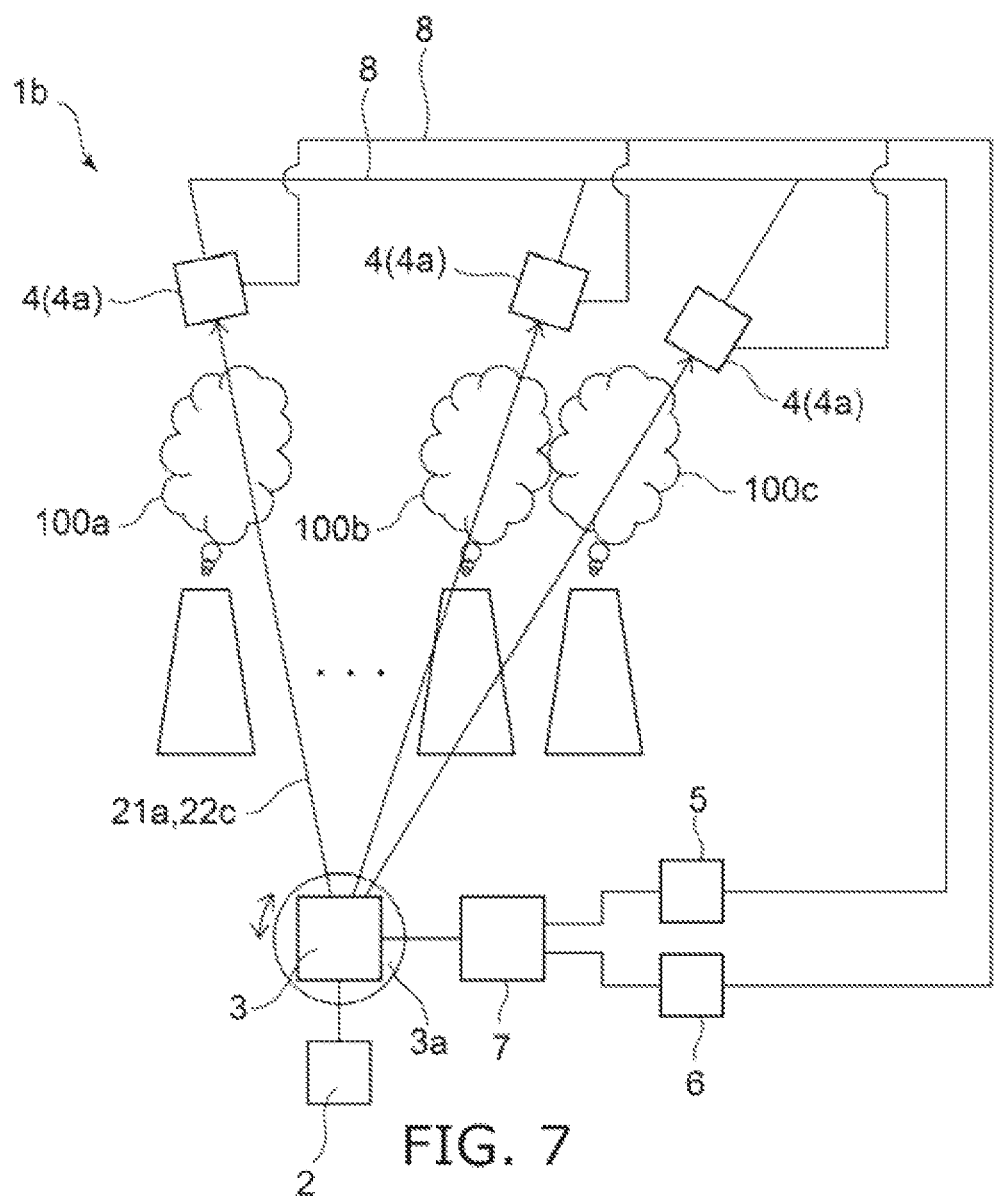
FIG. 7 is a schematic view illustrating a gas detection device according to another embodiment.

FIG. 7 is a schematic view illustrating a gas detection device 1b according to another embodiment.

FIG. 7 shows the case where multiple gases 100a to 100c at relatively separated positions are detected.

As shown in FIG. 7, the irradiation position adjustment part 3 can be located at one side of the multiple gases 100a to 100c; and the light splitting parts 4 (4a) can be located at the side of the multiple gases 100a to 100c opposite to the irradiation position adjustment part 3. For example, each of the multiple light splitting parts 4 (4a) can be connected with the gas analysis part 5 and the gas visualization part 6 by using a light guide body 8 such as an optical fiber or the like, an optical system including a lens and/or reflection plate, etc. Also, a moving part 3a that moves the position of the irradiation position adjustment part 3 also can be included. By including the moving part 3a, it is easy to irradiate the lights 21a and 22c at the appropriate positions of the multiple gases 100a to 100c even when the positions of the multiple gases 100a to 100c are separated. The gas 100a to 100c may be the same or different gas species. In the case of different gas species, the analysis of the multiple different gas species can be performed by changing the wavelength of the light 21a.

The controller 7 irradiates the lights 21a and 22c toward the gas that is the measurement object by controlling at least one of the irradiation position adjustment part 3 or the moving part 3a. Thus, appropriate detection of each of the multiple gases 100a to 100c can be performed.

The gas analysis part 5, the gas visualization part 6, and the controller 7 can be shared. Therefore, compared to when the gas detection device 1 (1a) is provided for each of the multiple gases 100a to 100c, an inexpensive gas detection device 1b can be realized.

A gas detection method according to the embodiment will now be described.

For example, the gas detection method according to the embodiment can be performed using the gas detection device 1 (1a, 1b).

The gas detection method irradiates the lights 21a and 22c on the gas 100.

The gas detection method can include, for example, the following processes:
a process of visualizing the concentration distribution of the gas 100 based on the light 22c having passed through the gas 100;
a process of controlling the irradiation position of the light 21a on the gas 100 based on the visualized concentration distribution of the gas 100; and
a process of analyzing the components of the gas 100 based on the light 21a having passed through the gas 100.

In such a case, the wavelength of the light 21a can be 0.7 μm or more.

The light 22c can be visible light.

In the process of visualizing the concentration distribution of the gas 100, the concentration distribution of the gas 100 can be visualized using a schlieren method.

The contents of the processes can be similar to those described above; and a detailed description is therefore omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A gas detection device, comprising:
a first irradiation part configured to irradiate a first light on a gas released into a space, the first light having a first wavelength;
a second irradiation part configured to irradiate a second light on the gas, the second light having a second wavelength that is less than the first wavelength, the second irradiation part including at least one light-emitting part and a filter forming a dot pattern, the second light irradiated from the light-emitting part being irradiated on the gas via the filter forming the dot pattern, an unevenness being provided in a surface of the filter forming the dot pattern;
an irradiation position adjustment part configured to control an irradiation position of the first light on the gas;
a gas analysis part configured to analyze a component of the gas based on the first light having passed through the gas; and
a gas visualization part configured to visualize a concentration distribution of the gas based on the second light having passed through the gas,
the irradiation position adjustment part controlling the irradiation position of the first light on the gas based on the visualized concentration distribution of the gas.

2. The gas detection device according to claim 1, wherein
the first wavelength is not less than 0.7 μm, and
the first irradiation part is a quantum cascade laser.

3. The gas detection device according to claim 1, wherein the second light is visible light.

4. The gas detection device according to claim 1, wherein the second wavelength of the second light is not less than 360 nm and not more than 830 nm.

5. The gas detection device according to claim 1, wherein
a plurality of the light-emitting parts is included, and
the plurality of light-emitting parts surround the first irradiation part when viewed along a direction along an optical axis of the first irradiation part.

6. The gas detection device according to claim 5, wherein
the plurality of light-emitting parts is positioned to have point symmetry around the optical axis of the first irradiation part.

7. The gas detection device according to claim 1, wherein
the filter forming the dot pattern is plate-shaped and is located at an irradiation side of the second light of the light-emitting part.

8. The gas detection device according to claim 7, wherein
the filter forming the dot pattern includes a hole extending through the filter in a thickness direction.

9. The gas detection device according to claim 8, wherein
the second light irradiated from the light-emitting part is irradiated on the gas via the hole.

10. The gas detection device according to claim 1, wherein
an arrangement of the unevenness is random.

11. The gas detection device according to claim 1, wherein
the filter forming the dot pattern is a filter forming a random dot pattern.

12. The gas detection device according to claim 1, wherein
the irradiation position adjustment part also is configured to control an irradiation position of the second light on the gas.

13. The gas detection device according to claim 12, wherein
the irradiation position adjustment part includes:
a mirror reflecting the first and second lights that are incident on the mirror, the mirror being pivotable; and
a driver changing an angle of the mirror, and
the driver changes irradiation positions of the first and second lights on the gas by changing reflection angles of the first and second lights by changing the angle of the mirror.

14. The gas detection device according to claim 1, further comprising:
a first light splitting part, wherein the first and second lights having passed through the gas are incident on the first light splitting part, the first light splitting part transmits the incident first light and causes the incident first light to be incident on the gas analysis part, and the first light splitting part reflects the incident second light and causes the incident second light to be incident on the gas visualization part.

15. The gas detection device according to claim 1, further comprising:

a second light splitting part, wherein the first and second lights having passed through the gas are incident on the second light splitting part, the second light splitting part includes a hole extending through the second light splitting part in a thickness direction, the second light splitting part causes the incident first light to be incident on the gas analysis part via the hole, and the second light splitting part reflects the incident second light and causes the incident second light to be incident on the gas visualization part.

16. The gas detection device according to claim 1, further comprising:

a moving part configured to move a position of the irradiation position adjustment part.

17. A gas detection method irradiating a first light and a second light on a gas released into a space, the first light having a first wavelength, the second light having a second wavelength that is less than the first wavelength, the method comprising:

irradiating the gas with the first light and the second light, the second light being irradiated on the gas via a filter forming a dot pattern, an unevenness being provided in a surface of the filter forming the dot pattern;

visualizing a concentration distribution of the gas based on the second light having passed through the gas;

controlling an irradiation position of the first light on the gas based on the visualized concentration distribution of the gas; and analyzing a component of the gas based on the first light having passed through the gas.

18. The method according to claim 17, wherein the first wavelength is not less than 0.7 μm, the second light is visible light, and the visualizing of the concentration distribution of the gas includes visualizing the concentration distribution of the gas by using a schlieren method.

* * * * *